United States Patent
Tucci

(10) Patent No.: US 10,102,479 B2
(45) Date of Patent: Oct. 16, 2018

(54) METHOD FOR PROJECTING OUT IRREDUCIBLE REPRESENTATIONS FROM A QUANTUM STATE OF N PARTICLES WITH D COLORS

(71) Applicant: Robert Ralph Tucci, Woburn, MA (US)

(72) Inventor: Robert Ralph Tucci, Woburn, MA (US)

( * ) Notice: Subject to any disclaimer, the term of this patent is extended or adjusted under 35 U.S.C. 154(b) by 248 days.

(21) Appl. No.: 14/941,464

(22) Filed: Nov. 13, 2015

(65) Prior Publication Data

US 2016/0110311 A1    Apr. 21, 2016

(51) Int. Cl.
*G06N 99/00* (2010.01)

(52) U.S. Cl.
CPC .................. *G06N 99/002* (2013.01)

(58) Field of Classification Search
CPC ....... G06N 99/002; G06F 15/82; G06F 17/11; G06F 7/05
See application file for complete search history.

(56) References Cited

U.S. PATENT DOCUMENTS

| 8,190,553 | B2 * | 5/2012 | Routt | B82Y 10/00 |
| | | | | 706/62 |
| 8,612,499 | B1 | 12/2013 | Tucci | |

| 2006/0224547 | A1 * | 10/2006 | Ulyanov | B82Y 10/00 |
| | | | | 706/62 |
| 2009/0164435 | A1 * | 6/2009 | Routt | B82Y 10/00 |

OTHER PUBLICATIONS

D. Bacon, "How a Clebsch-Gordan transform helps to solve the Heisenberg hidden subgroup problem", arXiv:quant-ph/0612107.
D. Bacon, I.Chuang, and A. Harrow, "Efficient Quantum Circuits for Schur and Clebsch-Gordan Transforms", arXiv:quant-ph/0407082.
D. Bacon, I.Chuang, and A. Harrow, "The Quantum Schur Transform: I. Efficient Qudit Circuits", arXiv:quant-ph/0601001.
R.R. Tucci, "A Rudimentary Quantum Compiler (2cnd Ed.)", arXiv quant-ph/9902062.
Predrag Cvitanovic, "Group theory: birdtracks, Lie's, and exceptional groups" (Princeton University Press, 2008) Also available on the web.
S. Devitt, Kae Nemoto, and W. Munro, "Quantum error correction for beginners", arXiv:0905.2794.
A. Harrow, "Applications of coherent classical communication and the Schur transform to quantum information theory", arXiv:quant-ph/0512255.
P. Jakubczyk, Y. Kravets, D. Jakubczyk,"An alternative approach to the construction of Schur-Weyl transform", arXiv:1409.6130.

(Continued)

*Primary Examiner* — Harry W Byrne

(57) ABSTRACT

We describe a method for using a classical computer to generate a particular sequence of elementary operations (SEO), an instruction set for a quantum computer. Such a SEO will induce a quantum computer to perform a unitary transformation U that we call an Irreps Gen U. This U simultaneously diagonalizes a set of operators $H_\mu$ called HYPs (Hermitian Young Projectors) for n particles with d colors or, equivalently, for n qu(d)its. $H_\mu$ projects out n particle irrep $\mu$ of U(d).

6 Claims, 7 Drawing Sheets

$$\Lambda_{N_{ir}} \ldots \Lambda_3 \Lambda_2 \Lambda_1 U = -1 \quad 501$$

ALGORITHM 2    502
(for decomposing irreps gen $U$ into a product of $\mu$-HTs )

$\mathcal{U} : \sum_\mu H_\mu D_\mu,$
for $J \in \{J_1, J_2, J_3, \ldots, J_{N_{ir}}\}\{$
   $\mathcal{U} : \text{next\_HT}(\mathcal{U}, J)$
$\}$
$\text{next\_HT}(\mathcal{U}, J)\{$
   $H : \mathcal{U} J \mathcal{U}^\dagger,$
   $D : \frac{1}{J\mathcal{U}^\dagger J},$
   $\alpha : J + JHD,$
   $J^c : 1 - J,$
   $\Lambda : \begin{bmatrix} -D^\dagger H J & -D^\dagger H J^c \\ -J^c H D \frac{1}{\alpha} \alpha^\dagger & J^c - J^c H D \frac{1}{\alpha} D^\dagger H J^c \end{bmatrix}, \quad 503$
   save this $\Lambda$ in a sequential list of them outside this subroutine,
   return $\Lambda \mathcal{U}$
$\}$

(56) References Cited

OTHER PUBLICATIONS

S. Keppeler, M. Sjodahl, "Hermitian Young Operators", arXiv:1307.6147.
Zhong-Qi Ma, "Group Theory for Physicists" (World Scientific, 2007).
P. Nataf, F. Mila, "Exact Diagonalization of Heisenberg SU(N) models", arXiv:1408.5341 [quant-ph].
R.R. Tucci, "QC Paulinesia", arXiv:quant-ph/0407215.
M. Soeken, S. Frehse, R. Wille, and R. Drechsler, "RevKit: A Toolkit for Reversible Circuit Design", {\it Multiple-Valued Logic and Soft Computing 18, No. 1 (2012): 55-65.}.
Irene Verona Schensted, "A course on the application of group theory to quantum mechanics" (Peaks Island, Maine: Neo Press, 1976).
R.R. Tucci, "Quantum Circuit for Unitary Matrix that Simultaneously Diagonalizes Set of Hermitian Young Projection Operators". Unpublished.

* cited by examiner

Figure 2

$Z_{a,b} = \{a, a+1, \ldots, b\}$     *201*

$\{H_\mu : \mu \in stabs(n,d)\}$     *202*

$stabs(n,d) = Z_{1,N_{ir}}$     *203*

$J_A = \sum_{k \in A} |e_k\rangle \langle e_k|$     *204*

$J_A^c = 1 - J_A = \sum_{k \in A^c} J_k$     *205*

$M_{J_A, J_B} = J_A M J_B$     *206*

$\dfrac{1}{M_{J,J}} = (JM_{J,J}J + J^c)^{-1} - J^c$     *207*

$M = \left[\begin{bmatrix} JMJ & JMJ^c \\ J^cMJ & J^cMJ^c \end{bmatrix}\right]$     *208*

$= JMJ + JMJ^c + J^cMJ + J^cMJ^c$

Figure 3

$J$-properties
301
$$\begin{cases} J_\mu J_\nu = \delta_{\mu,\nu} J_\mu \\ \sum_\mu J_\mu = 1 \\ J_\mu \text{ is diagonal} \end{cases}$$

$H$-properties
302
$$\begin{cases} H_\mu H_\nu = \delta_{\mu,\nu} H_\mu \\ \sum_\mu H_\mu = 1 \\ H_\mu^\dagger = H_\mu \end{cases}$$

$A$ lives in $\mu$ if $A = J_\mu A J_\mu$    303

$D_\mu$ lives in $\mu$    304

$U = \sum_\mu H_\mu D_\mu$    305

Figure 4

$$X_\mu = L2M(x_1^\mu, x_2^\mu, \ldots x_{N_{st}}^\mu) \quad 401$$

$$X_\mu X_\nu = 0 \text{ if } \mu \neq \nu \quad 402$$

$$H_\mu(X_\mu - 1)H_\mu = 0 \quad 403$$

$$x_k = x_k^{\mu(k)} \quad 404$$

$$D_\mu D_\mu^\dagger = \frac{1}{J_\mu H_\mu J_\mu} = U_\mu X_\mu U_\mu^\dagger \quad 405$$

$$D_\mu = U_\mu \sqrt{X_\mu} \quad 406$$

Figure 5

$$\Lambda_{N_{ir}} \ldots \Lambda_3 \Lambda_2 \Lambda_1 U = -1 \quad 501$$

ALGORITHM 2    502
(for decomposing irreps gen $U$ into a product of $\mu$-HTs)

$\mathcal{U} : \sum_\mu H_\mu D_\mu,$
for $J \in \{J_1, J_2, J_3, \ldots, J_{N_{ir}}\}\{$
    $\mathcal{U} : \text{next\_HT}(\mathcal{U}, J)$
$\}$ $\text{next\_HT}(\mathcal{U}, J)\{$
    $H : \mathcal{U} J \mathcal{U}^\dagger,$
    $D : \frac{1}{\sqrt{j\mathcal{U}^\dagger j}},$
    $\alpha : J + JHD,$
    $J^c : 1 - J,$
    $\Lambda : \left[ \begin{array}{c|c} -D^\dagger H J & -D^\dagger H J^c \\ \hline -J^c H D \frac{1}{\alpha} \alpha^\dagger & J^c - J^c H D \frac{1}{\alpha} D^\dagger H J^c \end{array} \right],$   503 save this $\Lambda$ in a sequential list of them outside this subroutine,
    return $\Lambda \mathcal{U}$
$\}$

Figure 6

$$\Lambda_\mu^\dagger = \underbrace{\begin{bmatrix} (L_\mu)_{J_\mu,J_\mu} & 0 \\ 0 & (L'_\mu)_{J_\mu^c,J_\mu^c} \end{bmatrix}}_{=\mathcal{L}_\mu} \underbrace{\begin{bmatrix} (C_\mu)_{J_\mu,J_\mu} & -(S_\mu)_{J_\mu,J_\mu^c} \\ (S'_\mu)_{J_\mu^c,J_\mu} & (C'_\mu)_{J_\mu^c,J_\mu^c} \end{bmatrix}}_{=\mathcal{M}_\mu} \underbrace{\begin{bmatrix} (R_\mu)_{J_\mu,J_\mu} & 0 \\ 0 & (R'_\mu)_{J_\mu^c,J_\mu^c} \end{bmatrix}}_{=\mathcal{R}_\mu} \quad 601$$

602 if $\operatorname{tr}(J_\mu) = 2$ and $\operatorname{tr}(J_\mu^c) = 3$, then $$\mathcal{M}_\mu = \left[\begin{array}{cc|ccc} c_1 & 0 & -s_1 & 0 & 0 \\ 0 & c_2 & 0 & -s_2 & 0 \\ \hline s_1 & 0 & c_1 & 0 & 0 \\ 0 & s_2 & 0 & c_2 & 0 \\ 0 & 0 & 0 & 0 & 1 \end{array}\right]$$

$$\mathcal{L}_\mu = A^{2\times 2} \oplus B^{2\times 2} \oplus [1]$$
$$\mathcal{R}_\mu = C^{2\times 2} \oplus D^{2\times 2} \oplus [1]$$

603 if $\operatorname{tr}(J_\mu) = 3$ and $\operatorname{tr}(J_\mu^c) = 2$, then $$\mathcal{M}_\mu = \left[\begin{array}{ccc|cc} c_1 & 0 & 0 & -s_1 & 0 \\ 0 & c_2 & 0 & 0 & -s_2 \\ 0 & 0 & 1 & 0 & 0 \\ \hline s_1 & 0 & 0 & c_1 & 0 \\ 0 & s_2 & 0 & 0 & c_2 \end{array}\right]$$

$$\mathcal{L}_\mu = A^{2\times 2} \oplus [1] \oplus B^{2\times 2}$$
$$\mathcal{R}_\mu = C^{2\times 2} \oplus [1] \oplus D^{2\times 2}$$

604

$$\begin{cases} A, B, C, D \text{ are unitary } 2 \times 2 \text{ matrices} \\ c_j = \cos(\theta_j), s_j = \sin(\theta_j) \text{ for } j = 1, 2 \end{cases}$$

Figure 7

$\sigma_X(\tau)^{P_b(\kappa)}$ 701

$\Gamma(\tau)^{H_\mu(\kappa^n)} = U(\kappa^n)\Gamma(\tau)^{J_\mu(\kappa^n)}U^\dagger(\kappa^n)$ 702

$\sigma_X(\tau)^{\prod_{\ell=1}^{L} P_{b_\ell}(\kappa_\ell)}$ 703

$\Gamma(\tau)^{\prod_{\ell=1}^{L} H_{\mu_\ell}(\kappa_\ell^{n_\ell})} =$ 704
$= \prod_{\ell=1}^{L} \{U_\ell(\kappa_\ell^{n_\ell})\} \Gamma(\tau)^{\prod_{\ell=1}^{L} \{J_{\mu_\ell}(\kappa_\ell^{n_\ell})\}} \prod_{\ell=1}^{L} \{U_\ell^\dagger(\kappa_\ell^{n_\ell})\}$ $B = \{|\mu, a\rangle : \mu \in stabs(n,d), a = 1, 2, \ldots, dim(\mu)\}$ 705

$B' = \{|b^n\rangle : b^n \in Z_{0,d-1}^n\}$ 706

$H_\mu = \sum_a |\mu, a\rangle \langle \mu, a|$ 707

$\updownarrow_{j+1}^{j}$ , where $j \in Z_{0, d^n - 2}$ 708

$\updownarrow_{j+1}^{j} = \sum_{\mu,\nu} [H_\mu \updownarrow_{j+1}^{j} H_\nu]$ 709

$\langle \mu, a | \updownarrow_{j+1}^{j} | \nu, b \rangle = \delta_{a,b} f_{\mu,\nu}^j$ 710

$H_{\mu,\nu} = \theta(\mu \sim \nu) \sum_a |\mu, a\rangle \langle \nu, a|$ 711

$\mathcal{V}_n = $ real span of$\{H_{\mu,\nu} : \mu, \nu \in stabs(n,d)\}$ 712

METHOD FOR PROJECTING OUT IRREDUCIBLE REPRESENTATIONS FROM A QUANTUM STATE OF N PARTICLES WITH D COLORS

CROSS REFERENCES TO RELATED APPLICATIONS

This patent application makes reference to patent application Ser. No. 14/499,539 by R. R. Tucci entitled: "Method For Projecting Out Irreducible Representations From a Quantum State Of Multiple Qubits".

STATEMENT REGARDING FEDERALLY SPONSORED RESEARCH AND DEVELOPMENT

Not Applicable

REFERENCE TO COMPUTER PROGRAM LISTING

A computer program listing consisting of a single file entitled:
IrrepsGen-d-colors-maxima.txt,
in ASCII format, is included with this patent application. The file is a collection of Maxima commands which do most of the labor-intensive calculations underpinning this invention. Maxima is a free, open source Symbolic Manipulation Program (SMP).

BACKGROUND OF THE INVENTION

(A) Field of the Invention

The invention relates to a quantum computer; that is, an array of quantum bits (called qubits). More specifically, it relates to methods for using a classical computer to generate a sequence of operations that can be used to operate a quantum computer.

(B) Description of Related Art

Henceforth, we will allude to certain references by codes. Here is a list of codes and the references they will stand for.
 Ref.Bac is D. Bacon, "How a Clebsch-Gordan transform helps to solve the Heisenberg hidden subgroup problem", arXiv:quant-ph/0612107
 Ref.BCH1 is D. Bacon, I. Chuang, and A. Harrow, "Efficient Quantum Circuits for Schur and Clebsch-Gordan Transforms", arXiv:quant-ph/0407082
 Ref.BCH2 is D. Bacon, I. Chuang, and A. Harrow, "The Quantum Schur Transform: I. Efficient Qudit Circuits", arXiv:quant-ph/0601001
 Ref.CSD is R. R. Tucci, "A Rudimentary Quantum Compiler (2cnd Ed.)", arXiv quant-ph/9902062
 Ref.Cvi is Predrag Cvitanovic, *Group theory: birdtracks, Lie's, and exceptional groups* (Princeton University Press, 2008) Also available on the web.
 Ref.Dev is S. Devitt, Kae Nemoto, and W. Munro, "Quantum error correction for beginners", arXiv:0905.2794
 Ref.Har is A. Harrow, "Applications of coherent classical communication and the Schur transform to quantum information theory", arXiv:quant-ph/0512255
 Ref.Jak is P. Jakubczyk, Y. Kravets, D. Jakubczyk, "An alternative approach to the construction of Schur-Weyl transform", arXiv:1409.6130
 Ref.Kep is S. Keppeler, M. Sjodahl, "Hermitian Young Operators", arXiv:1307.6147
 Ref.Ma is Zhong-Qi Ma, *Group Theory for Physicists* (World Scientific, 2007)
 Ref.NaMi is P. Nataf, F. Mila, "Exact Diagonalization of Heisenberg SU(N) models", arXiv:1408.5341 [quant-ph]
 Ref.Paulinesia is R. R. Tucci, "QC Paulinesia", arXiv: quant-ph/0407215
 Ref.RevKit is M. Soeken, S. Frehse, R. Wille, and R. Drechsler, "RevKit: A Toolkit for Reversible Circuit Design", *Multiple-Valued Logic and Soft Computing* 18, no. 1 (2012): 55-65.
 Ref.Schen is Irene Verona Schensted, *A course on the application of group theory to quantum mechanics* (Peaks Island, Me.: Neo Press, 1976)
 Ref.Tuc-HYP is R. R. Tucci, "Quantum Circuit For Unitary Matrix that Simultaneously Diagonalizes Set of Hermitian Young Projection Operators". Unpublished. Copy included as an appendix to Ref.Tuc-HYP-PAT.
 Ref.Tuc-HYP-PAT is R. R. Tucci, "Method For Projecting Out Irreducible Representations from a Quantum State Of Multiple Qubits", patent application Ser. No. 14/499,539
 Ref.TucOpAv is R. R. Tucci, "Method for Evaluating Quantum Operator Averages", U.S. Pat. No. 8,612,499
 Ref.Tuc-PRISM is R. R. Tucci, "How to Calculate and Compile the Irreps Generator for n Qu(d)its". Unpublished. Copy included as an appendix to this patent application.

This invention deals with quantum computing. A quantum computer is an array of quantum bits (qubits) together with some hardware for manipulating those qubits. Quantum computers with several hundred qubits have not been built yet. However, once they are built, it is expected that they will perform certain calculations much faster that classical computers. A quantum computer follows a sequence of elementary operations. The operations are elementary in the sense that they act on only a few qubits (usually 1, 2 or 3) at a time. Henceforth, we will sometimes refer to sequences as products and to operations as operators, matrices, instructions, steps or gates. Furthermore, we will abbreviate the phrase "sequence of elementary operations" by "SEO". SEOs for quantum computers are often represented by quantum circuits. In the quantum computing literature, the term "quantum algorithm" usually means a SEO for quantum computers for performing a desired calculation. Some quantum algorithms have become standard, such as those due to Deutsch-Jozsa, Shor and Grover. One can find on the Internet many excellent expositions on quantum computing.

By compiling a unitary matrix, we mean expressing it as a SEO (a.k.a, a quantum circuit).

This invention gives an application of Group Theory (or, more specifically, Group Representation Theory) to quantum computing.

Group Representation Theory is of great importance in Physics. For a non-rigorous, addressed mainly to physicists, introduction to Group Representation Theory, see, for example, the textbooks Ref.Schen, Ref.Ma, Ref.Cvi. Out of those textbooks, Ref.Cvi by Cvitanovic is unique in that it is the only one of the three that uses diagrammatic notation that Cvitanovic calls "birdtracks". Cvitanovic was not the first to use birdtracks, but he greatly advanced and popularized their use in Group Theory. Birdtracks are closely related to another diagrammatic notation, the quantum circuits used in quantum computing. This invention tries to merge these 2 types of diagrammatic notations.

A very important tool in Group Representation Theory is that of Young diagrams and their associated Young Projectors. Young diagrams have a long, illustrious history. They are discussed at length in the textbooks Ref.Schen, Ref.Ma, Ref.Cvi.

Young projectors are not generally Hermitian, but it is possible to construct Hermitian operators that project out the same subspaces as the usual Young projectors. We shall call such operators HYPs (Hermitian Young Projectors). Keppeler and Sjodahl were the first to give, in Ref.Kep, a method for constructing HYPs, together with a proof of the correctness of their method. In this invention, the Keppeler, Sjodahl method for constructing HYPs will be used frequently.

In this patent, the letters n and d will be reserved to denote the following. If d=2, 3, 4, . . . , then qu(d)its are the fundamental particles or quarks of U(d) (the set of d×d unitary matrices). Qu(d)its have d orthonormal states labeled $|j\rangle$ with $j \in \{0, 1, 2, \ldots, d-1\}$. A qu(d)it lives in the complex span of these d states. The d in U(d) is often called the number of colors. Qu(d)its with d=2 are called qubits. Each horizontal line or wire in a quantum circuit carries one qu(d)it. The letter n is often used to denote the number of horizontal lines in the quantum circuit. In this patent, the same number n will also be referred to as the number of particles or qu(d)its.

Since all the HYPs for a fixed (n, d) are mutually orthogonal, they will also commute with each other. By definition, the HYPs are all Hermitian. It follows that one can find a transformation U that diagonalizes at once all of the HYPs for fixed (n, d). We shall refer to this U as the Irreps Generator (or Irreps Gen for short) for n qu(d)its.

This patent builds on the results of Ref.Tuc-HYP-PAT, which is a previous patent application also by Tucci. Ref.Tuc-HYP-PAT gives a method of calculating and compiling an Irreps Gen for an arbitrary number n of particles but only for d=2 colors (qubits). Unfortunately, the method of Ref.Tuc-HYP-PAT does not generalize easily to arbitrary n and d (qu(d)its).

The preferred embodiment of this invention is a method for calculating and compiling an Irreps Gen U for arbitrary (n, d). Thus, the method of this patent is more general than that of Ref.Tuc-HYP-PAT in the values of d to which it applies. Furthermore, the methods of both patents are significantly different, even for d=2.

Whereas in Ref.Tuc-HYP-PAT, we referred to U as the stabsXqu(d)its or quantum Young transform, in this patent we change its name to the Irreps Gen.

To compile U in the preferred embodiment of this invention, we use the CS-Decomposition of Linear Algebra. This decomposition was first used for quantum computing in Ref.CSD. See Ref.CSD for references discussing the history and theory behind the CS Decomposition.

To compile U in the preferred embodiment of this invention, we first express it as a product of unitary matrices $\Lambda_\mu^\dagger$, each corresponding to a different irrep $\mu$. Then we apply the CS-Decomposition to each $\Lambda_\mu^\dagger$ separately. Since the method of compilation given in this paper respects the symmetry of the problem by applying the CS-Decomposition to each irrep $\mu$ separately rather than to the whole U at once, we expect that it will lead to much shorter SEOs than if the method did not respect the symmetry of the problem.

FIG. 7 below is dedicated to explaining some of the many applications of the Irreps Gen.

Bacon, Chuang and Harrow have defined, in Ref.BCH1, Ref.BCH2, Ref.Har, and Ref.Bac, two transforms that they call the Clebsch Gordan (CG) and Schur transforms. When n=2, the Schur and CG transforms are equal. For arbitrary n, the Schur transform is a chain of CG transforms. In Ref.Tuc-HYP, we explain several significant differences between our Irreps Gen and their Schur transform.

In Ref.Jak, Jakubczyk et al give an "alternative approach" to calculating the same transform as Bacon, Chuang and Harrow. They don't mention the Keppeler, Sjodahl HYPs.

BRIEF SUMMARY OF THE INVENTION

The usual Young projectors are not generally Hermitian, but, inspired by conjectures of previous workers, Keppeler and Sjodahl showed in 2013 how to construct Hermitian operators that project out the same subspaces as the usual Young projectors. We shall call such operators HYPs (Hermitian Young Projectors). All HYPs for a fixed number n of qu(d)its are mutually commuting and Hermitian so there exists a unitary matrix that diagonalizes all of them at once. We call such a unitary matrix an Irreps Generator or Irreps Gen for short. The invention presented here is a method of constructing a quantum circuit for the Irreps Gen for arbitrary (n, d), where n is the number of particles or qu(d)its and d is the number of colors.

BRIEF DESCRIPTION OF THE DRAWINGS

FIG. 2 shows some nonstandard notation used in this patent. For example, this figure shows how we use projectors to indicate the partitioning of a matrix into 4 sub-blocks.

FIG. 3 shows how we define J-properties and H-properties, and how one can express the Irreps Gen U as a sum of operators with each summand corresponding to a different irrep $\mu$.

FIG. 4 shows how to calculate a $J_\mu$, and a $D_\mu$ for each $\mu=1, 2, \ldots, N_{ir}$.

FIG. 5 shows how to express the Irreps Gen U as a product of $\mu$-Householder Transformations $\Lambda_\mu^\dagger$ where $\mu=1, 2, \ldots, N_{ir}$.

FIG. 6 shows how to express the Irreps Gen U as a quantum circuit by applying the CS-decomposition to each $\Lambda_\mu^\dagger$ obtained in FIG. 5.

FIG. 7 shows two applications of the Irreps Gen U, (a) to produce exotic CNOTs and (b) to express conveniently an arbitrary qu(d)it permutation.

DETAILED DESCRIPTION OF THE INVENTION

Figure 1:
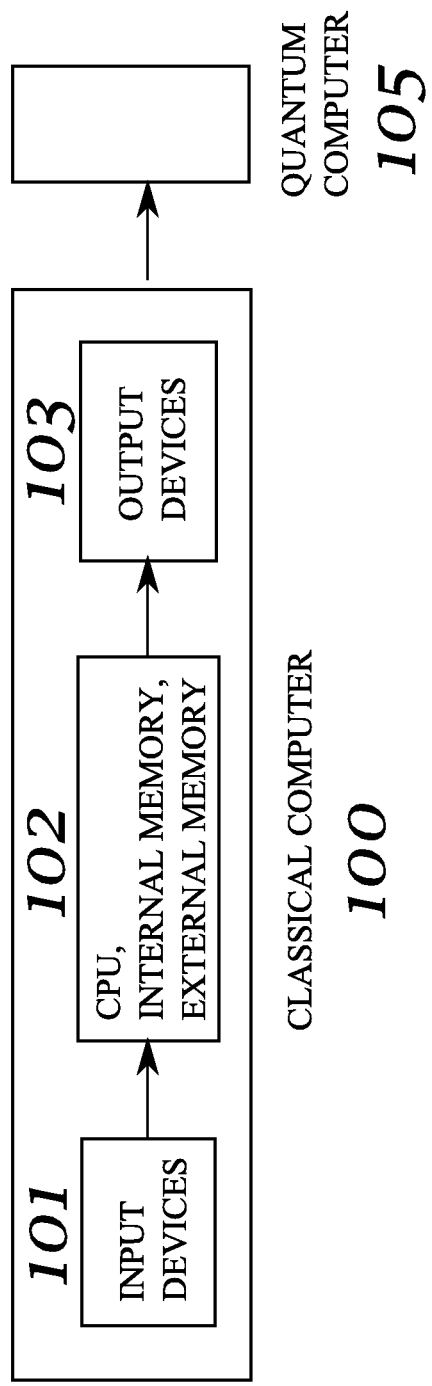
FIG. 1 shows a block diagram of a classical computer feeding data to a quantum computer.

This section describes in detail a preferred embodiment of the invention and other possible embodiments of the invention. For extra details about this invention, see Ref.Tuc-HYP, Ref.Tuc-HYP-PAT, Ref.Tuc-PRISM and references therein.

(A) Preferred Embodiment

FIG. 1 is a block diagram of a classical computer feeding data to a quantum computer. Box 100 represents a classical computer. The Irreps Gen SEO instruction set is generated inside Box 100. Box 100 comprises sub-boxes 101, 102, 103. Box 101 represents input devices, such as a mouse or a keyboard. Box 102 comprises the CPU, internal and external memory units. Box 102 does calculations and stores information. Box 103 represents output devices, such as a printer or a display screen. Box 105 represents a quantum computer, comprising an array of quantum bits and some hardware for manipulating the state of those bits.

Next consider FIG. 2.

For integers a, b such that a≤b, define $Z_{a,b}$ by 201.

Let $N_{st}=d^n$ be the number of states for n qu(d)its. We will often refer to n as the number of particles or qu(d)its and to d as the number of colors.

As indicated by 202, the HYPs $H_\mu$ are labeled by the elements of stabs(n, d). Here stabs(n, d) is the set of all standard Young Tableau with n boxes and ≤d rows. stabs(n, d) is also the set of n particle irreps $\mu$ of U(d). See Ref.Tuc-HYP for more information about the set stabs(n, d). In this patent, as indicated by 203, we will often identify the sets stabs(n, d) and $Z_{1,N_{ir}}$, where $N_{ir}$ equals the number of irreps (the cardinality of stabs(n, d)).

Let $|e_k\rangle$ for k=1, 2, . . . , $N_{st}$ denote an orthonormal $N_{st}$-dimensional basis. Let A be a subset of $Z_{1,N_{st}}$ and $A^c$ the complement of A in $Z_{1,N_{st}}$. Then $J_A$ and its complement $J_A^c$ are defined by 204 and 205, respectively.

We will write $M_{J_A,J_B}$ for the projection 206 of a general $N_{st} \times N_{st}$ matrix M.

If $J=J_A$ for some $A \subset Z_{1,N_{st}}$ and M is an $N_{st} \times N_{st}$ matrix, we define by 207 the "J-block inverse of M", assuming it exists. Here $\Omega^{-1}$ denotes the usual inverse of a square matrix $\Omega$. Clearly, the J-block inverse of M inverts only the sub-block of M given by its J rows and columns.

If $J=J_A$ for some $A \subset Z_{1,N_{st}}$ and M is an $N_{st} \times N_{st}$ matrix, we will often symbolically partition M into the 4 quadrants corresponding to the J and $J^c$ rows and columns of M. We will do so by writing 208.

Note that in 208, [[·]] does not stand for the conventional matrix symbol since all the entries inside the [[·]] are conventional $N_{st} \times N_{st}$ matrices themselves. As indicated by 208, the [[·]] symbol is just a convenient way of organizing 4 matrices of the same size and indicating that all 4 should be summed together. For the remainder of this patent, we will be lazy and use [·] to indicate both [[·]] and the conventional [·]. Which one we are referring to should be clear to the reader from context.

Next consider FIG. 3.

Consider a set $\{J_\mu: \mu=1, 2, \ldots N_{ir}\}$ of matrices (or associated linear operators), all square and of the same size. We will say that such a set satisfies the J-properties if for all $\mu$ and $\nu$, 301 is satisfied.

Consider a set $\{H_\mu: \mu=1, 2, \ldots N_{ir}\}$ of matrices (or associated linear operators), all square and of the same size. We will say that such a set satisfies the H-properties if for all $\mu$ and $\nu$, 302 is satisfied.

We will say that an operator A lives in irrep $\mu$ (with respect to a set of $J_\mu$ operators that satisfies the J-properties) if 303 is satisfied. We will consider a set of operators $D_\mu$ that satisfies 304 for all $\mu$.

Suppose U is a unitary matrix that can be expressed as 305, where the $H_\mu$ satisfy the H-properties and $D_\mu$ lives in $\mu$ for all $\mu$. Then we will refer to U as the Irreps Gen (Irreducible representations Generator). In this patent, we will use the letter U exclusively for that transform, except when we use it for U(d), the group of d×d unitary matrices. Note that there is a different U for each (n, d) pair.

Next consider FIG. 4.

Ref.Kep gives us a method for calculating a set of HYPs $H_\mu$ that satisfies the H-properties. FIG. 4 gives an algorithm such that, given a set of $H_\mu$ that satisfies the H-properties, we can do all of the following: compute a set of $J_\mu$ that satisfies the J-properties, and a set of $D_\mu$, such that for all $\mu$, $D_\mu$ lives in $\mu$, and $U=\Sigma_\mu H_\mu D_\mu$ is unitary.

Next we will describe very briefly the algorithm of FIG. 4. For a more detailed description of the algorithm, see Ref.Tuc-PRISM.

Let $X_\mu$ be defined by 401, where L2M( ) is a function that translates Lists to Matrices by taking its list argument and returning the diagonal matrix with that list argument as diagonal. Find as many $x_k^\mu$ as possible such that 402 and 403 are satisfied for all $\mu$, $\nu$. It's convenient to define $x_k$ by 404, where $\mu(k)$ is the single $\mu$ for which $x_k^\mu \neq 0$. Using the information collected so far for the $J_\mu$, find a full set of $J_\mu$ while being mindful of satisfying the J-properties and the constraint that $tr(J_\mu)=tr(H_\mu)$ for all $\mu$.

At this point, we should have $H_\mu$ and $J_\mu$ for all $\mu$. Using that information, one can find the $D_\mu$ for each $\mu$ via the equations 405 and 406, where $U_\mu$ is unitary and $X_\mu$ is defined by 401.

Next consider FIG. 5.

In FIG. 5, we define a generalization of the conventional Householder Transformations (HTs) of Linear Algebra. We will call such generalizations $\mu$-HTs. A conventional HT, when applied to a unitary matrix U, diagonalizes a single column of U. By "diagonalizes" a column of U, we mean that it makes all entries of the column equal to zero except for one of them. A $\mu$-HT, on the other hand, diagonalizes multiple columns of U at once; more precisely, it diagonalizes all columns of U corresponding to the irrep $\mu$.

Performing Algorithm 2 labeled 502 generates a sequence of $\mu$-HTs $\Lambda_\mu$ such that 501 is satisfied. (We will also refer to $\Lambda_\mu^\dagger$ as a $\mu$-HT). Since the $\Lambda_\mu$ are unitary, 501 can be easily inverted to express the Irreps Gen U as a product of $\Lambda_\mu^\dagger$ (times a trivial phase factor). Note how equation 503 expresses each $\Lambda_\mu^\dagger$ as a matrix partitioned into four quadrants given by the $J_\mu$ and $J_\mu^c$ rows and columns. We refer the reader to Ref.Tuc-PRISM for more details about the algorithm of FIG. 5.

Next consider FIG. 6.

In the previous figure, we showed how the Irreps Gen U can be expressed as a product of $\mu$-HTs. In this figure, we show how to compile each of these $\mu$-HT factors using the well-known (See Ref.CSD) CS-Decomposition of Linear Algebra.

The CS decomposition is performed on a unitary matrix which has been partitioned into four quadrants. At the same time, the $\Lambda_\mu^\dagger$ generated by Algorithm 2 of FIG. 5 are unitary matrices which are in the form 503, so they are a priori partitioned into four quadrants given by the $J_\mu$ and $J_\mu^c$ rows and columns. Thus, doing a CS-decomposition of a $\Lambda_\mu^\dagger$ with the predefined partitioning is very natural and it yields 601. In that figure, the diagonal blocks of $\mathcal{L}_\mu$ and $\mathcal{R}_\mu$ are unitary. Furthermore, all quadrants of $\mathcal{M}_\mu$ are diagonal and satisfy other constraints that are described in full generality in Ref.Tuc-PRISM. See that reference for more details.

Here is an example. If $tr(J_\mu)=2$ and $tr(J_\mu^c)=3$, then $\mathcal{M}_\mu$, $\mathcal{L}_\mu$ and $\mathcal{R}_\mu$ can be found of the form given by Box 602. If the 2 and 3 for the trace values are swapped, then we get 603 instead of 602. Note that 604 applies to both cases 602 and 603.

For each $\mu$, after doing a CS-Decomposition of $\Lambda_\mu^\dagger$, one can use the techniques described in Ref.CSD or similar ones to decompose the resulting matrices $\mathcal{L}_\mu$, $\mathcal{M}_\mu$, $\mathcal{R}_\mu$ into a SEO (sequence of elementary transformations).

Next consider FIG. 7.

FIG. 7 describes some possible applications of the invention. This figure is almost the same as FIG. 6 of Ref.Tuc-HYP-PAT, but it has been adapted so as to apply to arbitrary d instead of to only d=2.

One important application of the Irreps Gen is that it allows us to create a new kind of CNOT. The usual CNOT is 701 where $\tau$ is the target qubit, $\kappa$ is the control qubit, $\sigma_x$ is the X Pauli matrix, $b \in \{0,1\}$ and $P_b = |b\rangle\langle b|$. By virtue of $UJ_\mu U^\dagger = H_\mu$, one can construct the exotic singly controlled qu(d)it rotation given by 702, where $\tau$ is the target qu(d)it, and $\kappa''$ are n control qu(d)its. Also, $\Gamma(\tau)$ is an element of U(d) acting on $\tau$ and $H_\mu(\kappa'')$ with $\mu \in$ stabs(n, d) is a HYP acting on $\kappa''$. The $U(\kappa'')$ is the Irreps Gen acting on $\kappa''$.

One can also generalize a multiply controlled CNOT given by 703, where $\tau$ is the target qubit, $\kappa_l$ is a control qubit which is different for different l, and $b_l \in \{0, 1\}$, to an exotic multiply controlled qu(d)it rotation given by 704, where $\tau$ is the target qu(d)it and $\kappa_l^{n_l}$ are $n_l$ control qu($d_l$)its which are different particles for different l. Also, $\Gamma(\tau)$ is an element of U(d) acting on $\tau$ and $H_\mu(\kappa_l^{n_l})$ with $\mu \in$ stabs($n_l$, $d_l$) is a HYP acting on $\kappa_l^{n_l}$. The $U(\kappa_l^{h_l})$ are the Irreps Gen acting on $\kappa_l^{n_l}$.

HYPs also lead to a new, fairly simple matrix representation of arbitrary qu(d)it permutations. Next, we will say something about this new representation. See Ref.Tuc-HYP for more details for the case d=2. This new representation was inspired by Ref.NaMi written by Natal and Mila. They too are concerned with finding a convenient matrix representation for arbitrary qu(d)it permutations. Whereas we use HYPs, they use instead something invented by Young called "orthogonal units".

Suppose $\mu \in$ stabs(n, d). Let $|\mu, \alpha\rangle$ where $\alpha = 1, 2, \ldots$, dim($\mu$) be a set of orthonormal eigenvectors with eigenvalue 1 of $H_\mu$. Then the states in the set B defined by 705 are orthonormal. Furthermore, if B' is given by 706, then the complex span of B equals the complex span of B'. Call B the HYP basis. In the HYP basis, $H_\mu$ equals 707.

Let 708 denote a qu(d)it-swap of adjacent horizontal lines or qu(d)its j and j+1 in a qu(d)it circuit with horizontal lines labeled from top to bottom 0, 1, 2, ..., n–1. Using the fact that $\Sigma_\mu H_\mu = 1$, we get 709. By the Wigner-Eckart theorem, we expect 710, where $f_{\mu,\nu}^j$ is independent of $\alpha$, and it vanishes if $\mu \not\sim \nu$ (i.e., if $\mu$ and $\nu$ are not equivalent irreps).

For all $\mu, \nu \in$ stabs(n, d), define $H_{\mu,\nu}$ by 711, where $\theta(\mu \sim \nu)$ equals 1 if $\mu$ and $\nu$ are equivalent irreps, and it equals 0 otherwise. If we define $\nu_n$ by 712, then Ref.Tuc-HYP shows that any permutation of n qu(d)its is an element of $\nu_n$.

(B) Other Embodiments

The preferred embodiment of this invention is a method for calculating and compiling the Irreps Gen U for arbitrary (n, d).

It's important to note that most of the algorithms of this patent do not assume that the set of $H_\mu$ is necessarily a set of HYPs; they only assume that it satisfies the H-properties. Thus, the methods of this paper can also be applied to other sets of $H_\mu$ operators, as long as they satisfy the H-properties.

A standard definition in the field of quantum computation is that a qu(d)it is a quantum state that belongs to a d dimensional vector space and a qubit is a qu(d)it with d=2. In quantum error correction (see Ref.Dev for an introduction), one distinguishes between 2 types of qu(d)its, physical and logical. A logical qu(d)it is mapped into a number of physical qu(d)its. It goes without saying that the qu(d)its in the quantum circuit of Irreps Gen proposed in this invention can always be interpreted as logical qu(d)its, and additional gates can be added to that quantum circuit with the purpose of performing error correction.

By compiling U we mean expressing it as a SEO (sequence of elementary operations) on qubits, not qu(d)its, even in the case when the HYPs are for projecting out irreps of n qu(d)its with d≠2 colors. When d≠2, we will say that the HYP qu(d)its are meta-logical, whereas the qubits into which we compile them are logical. If quantum error correction is added, the logical qubits might themselves be encoded into physical qubits, or else the meta-logical qu(d)its might be encoded directly into physical qubits.

For convenience, the quantum circuit for the Irreps Gen proposed in this invention may include gates that act on more than 3 qubits at a time. Such "fat" gates might be judged by some not to be elementary gates as defined earlier in this patent. However, such fat gates should be allowed inside the SEO's covered by this invention for cases in which they are trivially expandable (TE) fat gates. By TE fat gates we mean, fat gates for which there are well known, expanding methods for replacing them by a sequence of gates that are strictly elementary, in the sense that they act on just one or two qubits at a time. Multi-controlled rotations and multiplexors are examples of TE fat gates. In fact, see the Java classes MultiCRotExpander and MultiplexorExpander and related classes available at www.ar-tiste.com and as a computer code appendix to several Tucci patents, for example Ref.TucOpAv. These classes automate such expanding methods for multi-controlled rotations and multiplexors.

A promising avenue for future research is to modify our exact method for computing U and seek a bounded error approximation for U and for its compilation, some sort of expansion in powers of 1/n useful when n≫1. That such an approximation is likely to exist can be inferred from the fact that for d=2 and large n, what we are dealing with is a system of n≫1 spin ½ quantum states, a system which should behave approximately as if it had classical angular momentum J=n/2.

So far, we have described some exemplary preferred embodiments of this invention. Those skilled in the art will be able to come up with many modifications to the given embodiments without departing from the present invention. Thus, the inventor wishes that the scope of this invention be determined by the appended claims and their legal equivalents, rather than by the given embodiments.

I claim:

1. A method of operating a classical computer and a quantum computer, comprising the steps of:
    calculating with said classical computer a total SEO that equals a unitary transformation U that acts on n qu(d) its, wherein U simultaneously diagonalizes a set of operators $H_\mu$ that satisfies the H-properties, wherein said U can be expressed in the form $$U = \sum_\mu H_\mu D_\mu,$$

wherein each operator $D_\mu$ lives $\mu$ (i.e., $J_\mu D_\mu J_\mu = D_\mu$) with respect to a set of $J_\mu$ operators that satisfies the J-properties, wherein said total SEO comprises a product of unitary operators $\Lambda_\mu^\dagger$, wherein each $\Lambda_\mu$ is designed to diagonalize for the matrix to which it is applied, all rows or columns corresponding to index $\mu$, applying said total SEO to n qubits of said quantum computer.

2. The method of claim 1, wherein said set of $H_\mu$ is a set of HYPs (Hermitian Young Projectors) and the index $\mu$ ranges over stabs(n, d) or a set with the same cardinality, wherein stabs(n, d) is the set of all Young Tableau with n boxes and $\leq d$ rows, wherein $H_\mu$ projects out the n particle irreducible representation $\mu$ of U(d).

3. The method of claim 1, wherein $$UJ_\mu U^\dagger = H_\mu$$

for all $\mu$.

4. The method of claim 1, wherein said total SEO induces said quantum computer to undergo an exotic controlled qu(d)it rotation R equal to $$\Gamma(\tau)^{H_\mu(\kappa^n)},$$

wherein $\tau$ is a target qu(d)it and $\kappa^n$ are n control qu(d)its, wherein $\Gamma(\tau)$ is an element of U(d) acting on $\tau$, wherein said unitary transformation U and its Hermitian conjugate $U^\dagger$ are sub-operations of said R (i.e., U and $U^\dagger$ are factors in a product that equals R), and said sub-operations act on the $\kappa^n$.

5. The method of claim 1, wherein for each $\mu$, $\Lambda_\mu^\dagger$ is decomposed into 3 factors as prescribed by the CS-Decomposition.

6. A device comprising:
a classical computer that calculates a total SEO that equals a unitary transformation U that acts on n qu(d)its, wherein U simultaneously diagonalizes a set of operators $H_\mu$ that satisfies the H-properties, wherein said U can be expressed in the form $$U = \sum_\mu H_\mu D_\mu,$$

wherein each operator $D_\mu$ lives in $\mu$ (i.e., $J_\mu D_\mu J_\mu = D_\mu$) with respect to a set of $J_\mu$ operators that satisfies the J-properties, wherein said total SEO comprises a product of unitary operators $\Lambda_\mu^\dagger$ wherein each $\Lambda_\mu$ is designed to diagonalize fx or the matrix to which it is applied, all rows or columns corresponding to index $\mu$, a quantum computer that executes said total SEO.

* * * * *